United States Patent [19]
Cone

[11] 3,925,844
[45] Dec. 16, 1975

[54] FIBER-LOADED WINDSHIELD WIPER SUPERSTRUCTURE
[75] Inventor: Irwin C. Cone, Littleton, Colo.
[73] Assignee: The Gates Rubber Company, Denver, Colo.
[22] Filed: July 15, 1974
[21] Appl. No.: 488,372

[52] U.S. Cl. ............................................ 15/250.42
[51] Int. Cl.² ............................................ B60S 1/02
[58] Field of Search....... 15/250.35, 250.36, 250.42; 260/42.18; 264/108, 24; 161/170

[56] References Cited
UNITED STATES PATENTS

| | | | |
|---|---|---|---|
| 3,178,753 | 4/1965 | Wise | 15/250.42 |
| 3,348,257 | 10/1967 | Hadekel | 15/250.42 |
| 3,404,203 | 10/1968 | Donald | 264/108 |
| 3,684,645 | 8/1972 | Temple et al. | 161/170 X |
| 3,820,188 | 6/1974 | Moorhead et al. | 15/250.42 |
| 3,837,033 | 9/1974 | van den Berg et al. | 15/250.32 |

FOREIGN PATENTS OR APPLICATIONS

| | | | |
|---|---|---|---|
| 1,090,122 | 9/1960 | Germany | 15/250.42 |
| 1,211,737 | 11/1970 | United Kingdom | 264/108 |

Primary Examiner—Peter Feldman
Attorney, Agent, or Firm—Curtis H. Castleman, Jr.; Raymond Fink; H. W. Oberg, Jr.

[57] ABSTRACT

The invention discloses a windshield wiper superstructure yoke or lever arm fabricated of a polymeric matrix molded to the desired shape and in which is embedded through at least a portion of the length of the yoke fibrous material whose tensile strength is greater than that of the polymeric matrix. At least near the outer surfaces of the yoke the fibrous material is oriented predominantly longitudinally with respect to the lengthwise direction of the yoke and/or parallel or tangential to its outer surface.

11 Claims, 4 Drawing Figures

FIBER-LOADED WINDSHIELD WIPER SUPERSTRUCTURE

BACKGROUND OF THE INVENTION

This invention relates to windshield cleaning devices and particularly to plastic superstructures or holders in which is engaged the customary elastomeric wiping member with its associated backing member.

The use of plastic yokes in the superstructures of windshield wiper blades has gained impetus. Unlike their metal counterparts, the plastic yokes do not rattle, reflect glare, cut fingers or scratch windshields to any significant degree. Polymeric materials such as polycarbonate have been used extensively in this respect. However, the superstructure yokes fabricated of plastic materials may present problems with respect to dimensional stability, e.g., creep under continuous loading, and problems with stress cracking of the polymeric matrix particularly at or near the connection zones of the superstructure, e.g., at pin connection bores, which are inherently vulnerable to stress fatigue. The aforementioned problems can be accentuated when the blades are subjected to abnormal use, such as may be created by above normal wiper arm loading and exposure to adverse chemical environments such as found in certain windshield washer solutions.

The problem with stress cracking or crazing can be particularly destructive. The blade as it is flexed in its to and fro oscillation across the windshield can cause any cracks which have been formed in its surface to grow and eventually cause failure of the blade by fracturing.

It is a primary object of the present invention to overcome problems which may occur with the use of plastic yokes in the superstructures of windshield blades, and particularly to provide a superstructure yoke highly resistant to creep under load and resistant to failure due to initiation and propagation of cracks in the polymer matrix. It is a further object to produce a superstructure of very high flexural strength and resistance to chemical and weather influences.

SUMMARY OF THE INVENTION

Briefly described, the invention is drawn to elongated yokes or levers for assembly in a windshield wiper superstructure comprising a polymeric matrix in which is embedded through at least a significant portion of the length of the yoke fibrous material having a tensile strength greater than that of the material of the polymeric matrix. At least near the outer surface of the yoke a preponderance of the fibers are oriented substantially lengthwise or longitudinally with respect to the elongated yoke. Near the surface of the portions of the yoke for connection with another yoke or wiper arm connector, a preponderance of the fibers are oriented substantially parallel or tangentially with respect to the connection portions and lie in a plane substantially longitudinal with respect to the yoke and substantially normal to the windshield surface to be wiped.

BRIEF DESCRIPTION OF THE DRAWINGS

This invention will be described in conjunction with the following FIGURES which depict certain preferred aspects of the invention, and in which.

PREFERRED EMBODIMENTS OF THE INVENTION

Figure 1:
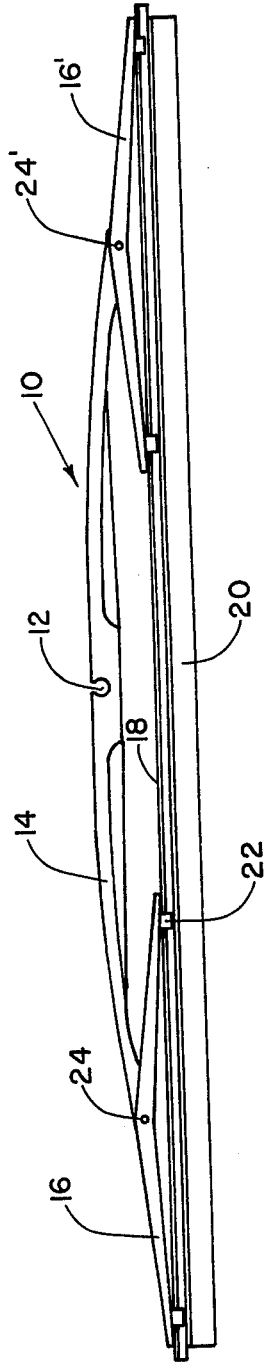
FIG. 1 is a side elevational view of a wiper blade having the yokes constructed according to the subject invention.

Referring to the drawings, a wiper assembly which may be used in conjunction with the windshield of an automobile, for instance, is generally designated at 10. A wiper actuator arm (not shown) has its free end engageable with an attaching clip in known manner (not shown) which in turn is pivotally mounted to transverse central bore 12 of the wiper assembly. In general, the wiper consists of a pressure-distributing superstructure which may be of various configurations, exemplified by a pair of secondary yokes 16, 16' connected intermediate their respective ends to a primary yoke lever 14 intermediately of which is positioned the aforementioned bore. The wiper assembly is completed by a blade subassembly or refill comprised of a squeegee support backing strip 18 and a conventional elastomeric wiping element or squeegee 20 held by the backing strip.

Each secondary yoke 16, 16' contains two pairs of transversely aligned or staggered claws 22 which slidably connect the superstructure to the blade subassembly maintaining it in operative association. While the superstructure is shown as being articulated with pin connections 24, 24' between the primary and secondary yokes, it will be understood that the superstructure can be formed of a unitary molded polymeric member.

Figure 2:
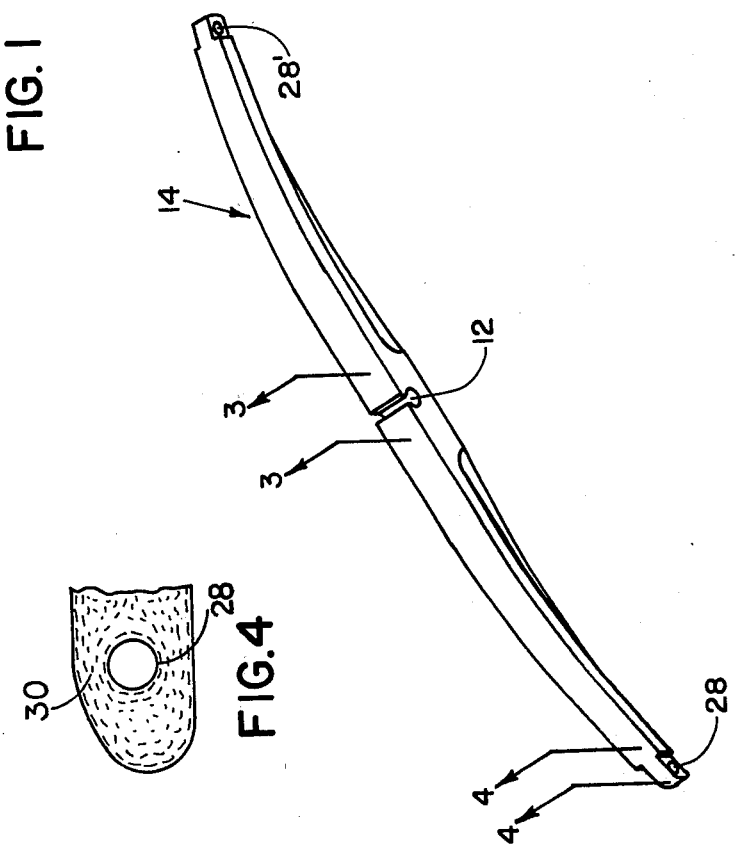
FIG. 2 is a perspective view of the primary yoke of FIG. 1.

In FIG. 2 are shown the end connection transverse bores 28, 28' through which the pins 24, 24' fasten together the primary and secondary yokes. These end bores together with the central bore 12 form connection zones normally subject to stress fatigue during operation.

According to the invention, at least one and preferably all of the yoke or lever portions of the superstructure are made of a polymeric material having embedded therein throughout the length of such yoke fibrous material such as glass fibers shown schematically at 26. Suitable weather resistant polymeric materials include acetal, nylon and polycarbonate resins. A particularly preferred material because of its flexural strength, chemical resistance, and processing compatibility with glass fibers is type 6/6 nylon (polyhexamethylene adipamide).

The fibrous loading material has a tensile strength exceeding and preferably at least 10 times and more preferably at least 20 times that of the polymeric matrix in which it is embedded. Various types of fibrous materials may be employed, exemplified by metallic fibers in the form of whiskers, for instance, inorganic non-metallic fibers such as the aforementioned fiber glass, and organic fibers such as polyester, or aramides such as Kevlar (a registered trademark of the duPont Company). Preferably the fibers form a mechanical or chemical bond with the polymeric matrix.

The length of the fibers is not narrowly critical and they may range from about one thirty-second up to about one-half inch, although preferably the length is in the range from about one-sixteenth to about one-eighth inches for enhanced processing. The longer fibers offer greater resistance to crazing and maximum flexural strength, although more difficult to injection mold.

Desired end properties such as flexibility of the yoke will dictate the length to diameter ratio of the fibers.

A satisfactory method for fabricating the fiber filled plastic yoke members is to form a mixture of a polymeric melt with entrained fibers and then injection mold the mixture into a mold cavity of desired elongated configuration. The amount of fiber loading will be determined by processability together with desired final characteristics, although preferably it has been found that from about 20 to about 45 percent by weight of the completed fiber loaded plastic yoke is formed of the fibrous loading material, with the more preferred range being from about 30 to about 40 percent by weight fiber loading based on the finished article. Materials which have been found suitable are 6/6 nylon loaded with from 25 to about 40 percent short glass fibers (less than about one-eighth inch in length). This latter material, when loaded with 40 percent glass (short fibers) exhibits a flexural strength (ASTM D 790-71) of 48,000, as molded, contrasted with a flexural strength of only 17,000 for the same nylon without glass loading. At equilibrium moisture of 50 percent relative humidity the glass filled nylon has a flexural strength of 35,000 compared with 6,100 for the unreinforced counterpart. High flexural strength is crucial toward meeting the objects of the invention, and in general it is preferred that the yoke have a flexural strength of at least 20,000 and more preferably at least 45,000 psi, as molded.

Orientation of the fibers within the polymer matrix is critical insofar as a predominant portion of the fibers are oriented substantially lengthwise or longitudinally with respect to the length of the yoke member. In other words, more of the fibers are oriented substantially longitudinally with respect to the yoke than in any other single direction. Such orientation occurs primarily near the surface of the yoke, e.g., within about 0.080 inches of the outer surface. Fibers characterized by such orientation are shown at 30, for instance. The farther from the surface, the more random the orientation generally becomes. Close to the surface of the yoke, i.e., within about 0.030 inches of the surface, it is preferred that at least a majority and more preferably at least 85 percent of the fibers are oriented within about 10° of the longitudinal axis of the yoke. The result is greatly improved flexural strength and resistance to bending forces created by the loads of the wiper arm attached to the primary yoke of the superstructure.

By orienting the fibers in the longitudinal direction and particularly near the surface of the yoke, the propensity of the yoke to form surface cracks due to imposed stresses is significantly reduced because the fibers reinforce and hold the polymeric body in a single unitary piece. The fibers act as a bridge or binder, and further by virtue of being bonded (in the preferred embodiment) to the polymeric body, resist the initiation of fissures or cracks at the surface portion of the yoke whether in tension or in compression. Even if stress cracking does begin to occur, the fibers will resist propogation and enlargement of the cracks by the binding or bridging function which they provide and thus will prevent failure of the blade in operation.

Figure 3:
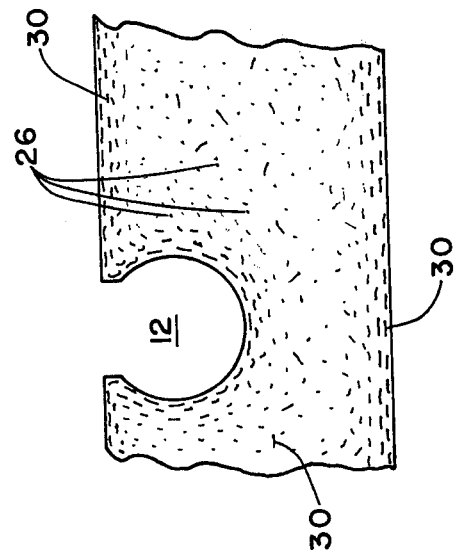
FIGS. 3 and 4 are respective partial longitudinal sectional views taken along sections 3—3 and 4—4 of FIG. 2, shown schematically.
Figure 4:
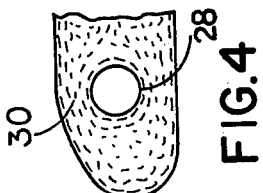

In a similar manner, those portions of the yoke which will form a connection with another yoke, connector, wiper arm, or the like, are often formed of transverse bores 12, 28, 28' or similar openings in the yoke and in these cases the fibers will preferably orient themselves longitudinally with respect to the yoke at the top and base of such connecting bores, and in general substantially parallel to the surface of the connection portion taken in longitudinal cross-section, for instance tangentially to the bore 12, 28 as shown in FIGS. 3 and 4, and in a plane perpendicular to the surface to be wiped by the windshield wiper structure.

It is a further advantage that the fibrous material in most instances will reduce the water take-up of the polymeric material, if the polymeric material is normally inclined to do so. Many polymeric materials lose flexural strength with water absorption. For instance, one commercial type of 6/6 nylon unloaded has a saturated moisture content of 8.5 percent whereas its 33 percent glass-filled counterpart has a saturation moisture content of only 5.3 percent, with a consequential increased flexural strength in the glass loaded material.

Additional advantages which the fiber-filled polymeric materials of the subject invention offer with respect to windshield wiper yokes are improved resistance to creep (i.e., improved dimensional stability) and increased impact strength. In the former case, the yoke members will maintain their respective shape and therefore retain the desired clearance and curvature between the yoke members 14, 16, 16' and the backing member 18 permitting the necessary pivotal deflection required at pivot points 24, 24' for conformance to acutely curved windshields. In the case of impact strength, it is well known that if the wiper arm is out of adjustment the wiper blade may be subjected to banging against the molding associated with the windshield and for this reason the blade must resist these continual impacts. The oriented fiber loading of the polymeric matrix according to the subject invention easily provides such resistance for long life.

It should be understood that the invention is capable of a variety of modifications and variations which will be made apparent to those skilled in the art by a reading of the specification and which are to be included within the sphere of the claims appended hereto.

What is claimed is:

1. An elongated yoke for a windshield wiper superstructure comprising:
a polymeric matrix in which is embedded through at least a portion of the length of the yoke fibers having a tensile strength greater than that of the polymeric matrix alone, more of said fibers being oriented substantially longitudinally with respect to the elongated yoke than in any other single direction, such longitudinal orientation being more prevalent near the outer surface of the yoke than inward of such outer surface.

2. A windshield wiper pressure transmitting superstructure including at least one flexible elongated plastic yoke member, said yoke comprising:
a molded polymeric matrix reinforced with fibrous material present in amount from about 20 to about 45 percent by weight based on the yoke member, said fibrous material having fiber lengths in the range of from about one thirty-second to about one-half inch and having a tensile strength greater than the polymer of the polymeric matrix and at least near the outer surface of the yoke the fibrous material is predominantly oriented in a lengthwise direction with respect to the yoke.

3. The superstructure of claim 2 wherein the polymeric material is selected from the group consisting of acetal, nylon and polycarbonate.

4. The superstructure of claim 3 wherein the fibrous material is selected from the group consisting of metallic fibers, fiber glass, polyester fibers and fibers made from aramides.

5. The superstructure of claim 2 wherein the fibrous material is fiber glass.

6. In a windshield wiper having an elastomeric wiping member held by a backing member, and a pressure transmitting and distributing superstructure attached to the backing member, said superstructure comprising at least one flexible elongated molded plastic yoke member, the improvement comprising:
   fibrous loading and reinforcing material embedded within the plastic and predominantly oriented along or near the surface of the plastic yoke substantially longitudinally with respect to the windshield wiper;
   said plastic yoke member with embedded fibrous loading having a flexural strength of at least about 20,000 psi, as molded.

7. The windshield wiper of claim 4 wherein the flexural strength of the plastic yoke member with embedded fibrous loading is at least about 45,000 psi, as molded.

8. A flexible yoke for a windshield wiper superstructure resistant to stress cracking and crack propogation comprising:
   an elongated polymeric body made of fiber glass loaded-nylon having a flexural strength of at least 20,000 psi, the predominant portion of said fibers near the surface of the yoke being oriented substantially longitudinally with respect to the yoke length, and the predominant portion of said fibers away from the surface of the yoke being oriented substantially randomly.

9. The yoke of claim 6 wherein within a zone of about 0.030 inches from the surface at least a majority of the fibers within the zone are oriented within about 10° of the longitudinal axis of the yoke.

10. In a windshield wiper having an elongated plastic yoke member including a transverse bore therein for connection with a wiper arm or other yoke member, the improvement comprising:
    fibrous loading material embedded in said plastic and in the vincinity of said bore oriented substantially parallel with respect to the bore surface as longitudinally sectioned and in a plane perpendicular to the plane of the windshield to be wiped.

11. A windshield wiper comprising:
    a wiping element retention member in engagement with and supporting the wiping element;
    an articulated superstructure for transmitting pressure to the wiping element and its retention member, said superstructure comprising an elongated primary yoke and a pair of elongated secondary yokes connected intermediate their ends to the primary yoke, at least one of said yokes being fabricated of a plastic material;
    means for attaching the secondary yokes to the wiping element retention member;
    fibrous loading material embedded within said plastic yoke and oriented near the outer surface of said plastic yoke predominantly longitudinally with respect to the lengthwise direction of the windshield wiper, and said fibrous loading material being progressively more randomly oriented as the distance increases from the outer surface of the plastic yoke.

* * * * *